April 12, 1927.
H. C. MALLORY
EXPANSIBLE COLLAPSIBLE ELEMENT
Original Filed June 7, 1916
1,624,348
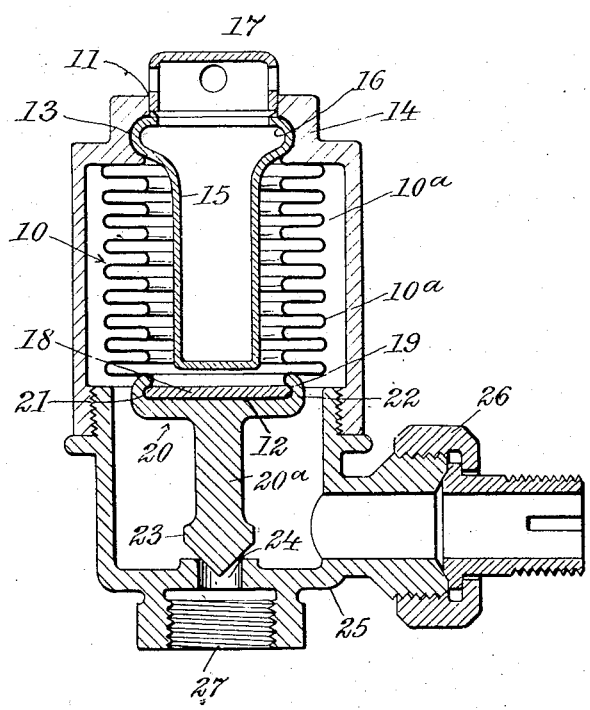
INVENTOR
Sue R. Mallory
Adm x. Est. of Harry C. Mallory
BY
Conrad A. Deters
her ATTORNEY Patented Apr. 12, 1927.

1,624,348

UNITED STATES PATENT OFFICE.

HARRY C. MALLORY, DECEASED, LATE OF BELLPORT, NEW YORK; BY SUE R. MALLORY, ADMINISTRATRIX, OF BELLPORT, NEW YORK.

EXPANSIBLE COLLAPSIBLE ELEMENT.

REISSUED

Original application filed June 7, 1916, Serial No. 102,115. Divided and this application filed January 30, 1924. Serial No. 689,401.

The invention relates to elastic elements, and the same has for its object more particularly to provide an elastic metallic element for use in connection with apparatus or devices subject to or influenced by temperature or pressure variations, whereby to operate a valve, apparatus or other mechanism.

Further, said invention has for its object to provide an expansible-collapsible element and, integral therewith, an imperforate or closed end portion therefor reinforced upon its inner and outer sides whereby to give greater strength and rigidity thereto and to permit said closed end to more efficiently cooperate with other parts, mechanisms or devices adapted to be operated or controlled by said element.

Further, said invention has for its object to provide a corrugated expansible-collapsible element for the purposes specified, and, integral therewith, an imperforate or closed end portion therefor reinforced upon its inner and outer sides by a pair of separate reinforcing members permanently secured thereto, of which, the outer of said members serves as a valve or other member adapted to coact with other parts, mechanisms or devices to be operated or controlled by said element.

Other objects will in part be obvious and in part be pointed out hereinafter.

To the attainment of the aforesaid objects and ends the invention consists in the novel details of construction, and in the combination, connection and arrangement of parts hereinafter more fully described and then pointed out in the claims.

In the accompanying drawing forming part of this specification wherein like numerals of reference indicate like parts;

The figure is a vertical sectional view showing one form of expansible-collapsible element constructed according to and embodying the said invention.

The invention is disclosed, for purposes of illustration, in connection with a thermostat steam trap such as is designed for use in connection with vacuum heating systems. The flexible or expansible-collapsible metallic element 10 is of the bellows type, i. e. comprises an intermediate portion with a series of circumferential corrugations 10ª therein and has an open end 11 and a closed end constituting an imperforate or fluid tight end portion 12 integral therewith.

The open end 11 of the element 10 is secured in a groove 13 in a valve bonnet 14 by means of a tubular member 15 extending into the hollow element 10 and provided with an expanded portion 16 compressing the wall of said open end 11 into the groove 13 to securely hold the same in position therein. A perforated metal cap 17 is placed over the member 15 to prevent dirt from entering into the same and to permit free circulation of air therein.

The closed or imperforate end 12 of the element 10 is reinforced upon its inner side by a flat metal disk or member 18 disposed therein, and secured by crimping or rolling the adjacent portion 19 of the wall of the element 10 over and around the edge of the same.

The outer side of the end 12 of element 10 is separately reinforced by a one piece member 20 having a stem 20ª integral therewith and projecting centrally therefrom. The reinforcing member 20 has a recess 21 in the upper face thereof formed by a rim or flange 22 integral with member 20. The interiorly reinforced end 12 of the element 10 is fitted within recess 21 of the member 20 and the flange 22 is crimped or rolled upwardly and inwardly around and over the disk 18 and the retaining portion 19 therefor, whereby the member 20 is firmly secured to the end 12, the latter being reinforced and clamped between member 20 and member 18.

The stem 20ª is illustrated as having at the end thereof a valve member 23 (which may be separately attached thereto, if desired) adapted to close and open an opening 24 in the valve body or casing 25 to control the device when the element 10 expands and contracts.

The valve body 25 is connected to a radiator by means of a union nut 26 and has a threaded connection 27 to an escape or return pipe.

The operation of thermostatic steam traps of the type described is well known and such operation need not be further elaborated.

In producing an expansible-collapsible element embodying the present invention, there is first formed the shell 10 having the closed end 12. The metal disk 18 is positioned therein and the portion 19 rolled or formed to retain the disk 18 in place. The shell 10 is then subjected to the action of suitable dies, whereby to circumferentially corrugate its intermediate or body portion to form the series of corrugations or folds 10ª therein.

Hereupon the outer reinforcing member 20 is seated or fitted upon the closed interiorly reinforced end 12 and the flange 22 thereof crimped, pressed or rolled firmly into engagement with the outer side of the retaining portion 19 for the disk 18 to reinforce said portion 19 and to provide a secure connection of member 20 thereto.

The member 18 disposed within the closed end 12 of the shell 10 and the member 20 secured to said closed end upon the outside thereof jointly serve to interiorly and exteriorly reinforce said closed end.

This application is a division of an application Serial No. 102,115, filed by Harry C. Mallory on June 7, 1916, the latter application in turn being a continuation in part of an application, Serial No. 833,593, filed by him April 22, 1914, renewed December 5, 1919, Serial No. 342,802 and patented January 25, 1921, No. 1,366,473.

Having thus described said invention, what is claimed and desired to secure by Letters Patent is:

1. An expansible-collapsible element comprising a shell having a circumferentially corrugated body portion, a closed end, a member disposed within said end to reinforce the same and engaged at the edge thereof by a portion of said shell, and a one piece reinforcing member including an intermediate portion engaging the outer side of said end and peripheral means extending over the portion of said shell engaging the edge of said inner member to secure said outer member to said end, substantially as specified.

2. An expansible-collapsible element comprising a shell having a circumferentially corrugated body portion, a closed end, a member disposed within said end to reinforce the same and engaged at the edge thereof by a portion of said shell, and a one piece reinforcing member including an intermediate portion engaging the outer side of said end, peripheral means extending over the portion of said shell engaging the edge of said inner member to secure said outer member to said end, and a stem projecting from said intermediate portion, substantially as specified.

3. An expansible-collapsible element comprising a shell having a circumferentially corrugated body portion, a closed end, a reinforcing disk disposed within said end and retained therein against the wall thereof by a portion of said shell, and a one piece reinforcing member including an intermediate portion engaging the outer side of said end, a peripheral flange extending over and around said disk retaining portion of said shell to reinforce the same and to secure said member to said end, and a stem integral with said intermediate portion and projecting therefrom, substantially as specified.

4. An expansible-collapsible element comprising a shell having a circumferentially corrugated body portion, a closed end, a reinforcing disk disposed within said end and retained therein against the wall thereof by a portion of said shell extending over and around the edge of said disk, a one piece reinforcing member including an intermediate portion engaging the outer side of said end, a peripheral flange extending over and around said disk retaining portion of said shell to reinforce the same and to secure said member to said end, and a stem integral with said intermediate portion and projecting centrally therefrom, and a valve member at the end of said stem, substantially as specified.

Signed at Bellport, in the county of Suffolk, and State of New York, this 28th day of Jan., one thousand nine hundred and twenty-four.

SUE R. MALLORY,
*Administratrix of the Estate of Harry C. Mallory.*